United States Patent
Yoakim et al.

(10) Patent No.: US 8,916,215 B2
(45) Date of Patent: Dec. 23, 2014

(54) SYSTEM, SET OF CAPSULES AND METHOD FOR PREPARING A BEVERAGE BY CENTRIFUGATION

(75) Inventors: Alfred Yoakim, St-Legier-La Chiesaz (CH); Alexandre Perentes, Lausanne (CH); Christian Jarisch, Lutry (CH)

(73) Assignee: Nestec S.A., Vevey (CH)

( * ) Notice: Subject to any disclaimer, the term of this patent is extended or adjusted under 35 U.S.C. 154(b) by 212 days.

(21) Appl. No.: 13/514,515

(22) PCT Filed: Nov. 25, 2010

(86) PCT No.: PCT/EP2010/068173
§ 371 (c)(1),
(2), (4) Date: Jun. 7, 2012

(87) PCT Pub. No.: WO2011/069830
PCT Pub. Date: Jun. 16, 2011

(65) Prior Publication Data
US 2012/0251677 A1   Oct. 4, 2012

(30) Foreign Application Priority Data

Dec. 8, 2009  (EP) .................................. 09178400

(51) Int. Cl.
  *B65B 29/02*  (2006.01)
  *A47J 31/22*  (2006.01)
  *B65D 85/804*  (2006.01)
(52) U.S. Cl.
  CPC ............. *A47J 31/22* (2013.01); *B65D 85/8043* (2013.01)
  USPC .............................................. 426/77; 99/295

(58) Field of Classification Search
  CPC ............................. B65D 85/8043; A47J 31/22
  USPC ................................................. 429/77; 99/295
  See application file for complete search history.

(56) References Cited

U.S. PATENT DOCUMENTS

2013/0206011 A1   8/2013 Ozanne et al.

FOREIGN PATENT DOCUMENTS

| EP | 0651963 A1 | 5/1995 |
| WO | 2006/112691 A1 | 10/2006 |
| WO | 2008/148601 A1 | 12/2008 |
| WO | 2008/148604 A1 | 12/2008 |
| WO | 2008/148646 A1 | 12/2008 |
| WO | 2009106175 | 9/2009 |

OTHER PUBLICATIONS

Written Opinion and International Search Report issued Apr. 4, 2011 for corresponding Intl. Appln. No. PCT/EP2010/068173.

*Primary Examiner* — Rena L Dye
*Assistant Examiner* — Chaim Smith
(74) *Attorney, Agent, or Firm* — K&L Gates LLP (57) ABSTRACT

A capsule system for preparing beverages by centrifugation of a capsule in a centrifuging brewing device comprising: a set of different capsules (1A, 1B, 1C, 1D, 1E), each of the capsules for selectively delivering a beverage, each capsule (1A, 1B, 1C, 1D, 1E) containing at least one beverage substance, each capsule of the set comprising a body (2) having an enclosure (6) containing the beverage substance, an upper wall (4) for closing the body (2) and optionally a flange-like rim (3), wherein the capsule is designed to form, alone or in cooperation with the centrifuging brewing device, a restriction or restriction valve of the centrifuged liquid, wherein the back pressure of the restriction or restriction valve differs for at least two capsules of the set.

10 Claims, 4 Drawing Sheets

SYSTEM, SET OF CAPSULES AND METHOD FOR PREPARING A BEVERAGE BY CENTRIFUGATION

CROSS REFERENCE TO RELATED APPLICATIONS

The present application is a National Stage of International Application No. PCT/EP2010/068173, filed on Nov. 25, 2010, which claims priority to European Patent Application No. 09178400.9, filed on Dec. 8, 2009, the entire contents of which are being incorporated herein by reference.

FIELD OF THE INVENTION

The present invention relates to a system for preparing a beverage from a beverage substance contained in the capsule by passing a liquid through the substance using centrifugal forces.

In particular, the present invention relates to capsules having varying rim members constituting an engagement portion which is designed for being engaged by a dedicated enclosing member of a beverage production device, thereby forming valve means for the centrifuged liquid.

BACKGROUND OF THE INVENTION

It exist systems for preparing beverages such as coffee by forcing a liquid through ingredients contained in the capsule using centrifugal forces.

WO 2008/148604 for example relates to a capsule for preparing a beverage or liquid food from a substance, in a centrifugal brewing unit, by passing water through the substance contained in the capsule by using brewing centrifugal forces comprising: an enclosure containing a predetermined dose of substance; opening means which opens under the centrifugal effect to allow the brewed liquid to leave the capsule. The capsule may also comprise means for engaging the capsule to external rotational driving means of a centrifugal brewing device wherein the engaging means are configured to offer a resistance to torque during rotation of the capsule for maintaining the capsule in a referencial rotational position.

Thereby, the effect of centrifugal forces to brew coffee or prepare other food substances presents many advantages compared to the normal brewing methods using pressure pumps. For example, in traditional espresso or lungo coffee type brewing methods using a pressure pump, it is very difficult to master all the parameters which influence the quality of extraction of delivered coffee extract. These parameters are typically the pressure, the flow rate which decreases with the pressure, the compaction of the coffee powder which also influences the flow characteristics and which depends on the coffee ground particle size, the temperature, the water flow distribution and so on. In particular, it is not easy to vary the extraction pressure and flow rates because there are essentially determined by the static pressure deliverable by the pump, the resistance of the bed of coffee and the downstream filtering system.

For a centrifugal extraction, the rotating capsule is used as a centrifugal pump. The rotational speed thus determines the flow rate of the centrifuged liquid coming out of the capsule. The quality of the beverage to be prepared depends on the control, in particular, of the flow rate. In particular, the flow rate is influenced by two parameters: the rotational speed of the capsule in the device and the back-pressure exerted on the centrifuged liquid before it is projected out of the capsule. For a given back-pressure, the higher the rotational speed, the larger the flow rate. Conversely, for a given rotational speed, the larger the back-pressure, the smaller the flow.

Whereas the rotational speed of the capsule is usually controlled by control means selectively activating a rotational motor of a centrifugal beverage production device, a predefined back-pressure is preferably obtained by a flow restriction of the centrifuged liquid at the outlet of the capsule or at the outside of a centrifugal cell carrying the capsule.

For example EP 0651 963 teaches that a pressure gradient is obtained by a rubber-elastic element interposed at the interface between the lid and the cup of the centrifugal cell. Such an element deforms elastically to leave a filtering passage for the liquid when a certain pressure is attained at the interface. The coffee grains are retained in the cell while centrifuged liquid is allowed to pass the filtering passage. Furthermore, document FR 2 487 661 and WO 2006/112691 relate to centrifugal systems wherein a fixed restriction is placed downstream of the filter to create a pressure gradient.

Moreover, WO 2008/148646 proposes a solution in which a flow restriction is placed in or outside the centrifugal cell. The flow restriction can comprise a regulating spring biased valve offering an effective back-pressure. The spring biased valve opens under the effect of a sufficient pressure of liquid exerting on the valve. The higher the speed, the larger the passage through the valve, and the higher the flow rate. The valve can be preloaded by a resilient element such as rubber or spring elements.

Therefore is a need for being able to provide beverages, (e.g. coffee) having different characteristics of intensity, taste, aroma, foam/crema in a system that is simple and versatile.

For prior art systems without back-pressure regulation, the problem is that the flow can be increased only by increasing the centrifugation speed. Therefore, this creates limits to vary the flow rate of the beverage, thereby also limiting the possibility to deliver beverages of different characteristics. Furthermore, too high rotational speeds may create problems such as noise, instability of the process, vibration and premature wearing of the mechanical pieces of the device.

The prior art beverage production systems however suffer the drawback that an adaptation of the back-pressure at the restriction valve to predefined values either requires an adjustment mechanism of the spring preconstraint in the device that makes it complex to adjust to a large variety of different predefined values of the back-pressure.

In particular, the user must adjust the spring preconstraint determining the back-pressure values before extraction, which is inconvenient in terms of usability of the device and increases the necessary preparation time.

Thereby, it is to be understood that in particular with respect to coffee beverages, the back-pressure applied on the centrifuged liquid, at a given rotational speed, determines the residence time of hot liquid (water) in contact with the coffee powder in the capsule and thereby influences directly the coffee taste and aroma. Furthermore, the organoleptic texture such as the foam/crema formed on top of the prepared beverage also depends on the applied back-pressure. Thus, with respect to the flow rate, as well as to the foam/crema, of a coffee beverage to be prepared, it is desired to adjust the values of the back-pressure imposed by the restriction valve, for instance, as a function of the type of the beverage ingredient provided in the capsule.

For example, a higher flow rate may be desired for long-volume coffee (e.g., lungo, filter coffee such as Americano) in order to avoid extraction of certain compounds that could cause bitterness to the coffee, and increase the preparation time. Vice versa, a lower flow rate may be desired for shorter coffee (e.g., ristretto or espresso).

Therefore, there is a need for a new and simpler capsule system providing the opportunity to dispense a wider choice of beverages providing different quality attributes, e.g., intensity, aroma level and/or crema, in particular, by more easily and accurately controlling the back-pressure exerted onto the centrifuged liquid.

The present invention provides a solution to the before-mentioned problems as well as offers additional benefits to the existing art.

OBJECT AND SUMMARY OF THE INVENTION

In a first aspect the invention proposes a capsule system for preparing beverages by centrifugation of a capsule in a centrifuging brewing device comprising:

a set of different capsules, each of the capsules for selectively delivering a beverage, each capsule containing at least one beverage substance, each capsule of the set comprising a body having an enclosure containing the beverage substance, an upper wall for closing the body and a flange-like rim, wherein the capsule is designed to form, alone or in cooperation with the centrifuging brewing device, a restriction or restriction valve for the centrifuged liquid, wherein the back pressure of the restriction or restriction valve differs for at least two different capsules of the set.

Preferably, the backpressure as obtained by the capsule alone or in cooperation with the device differs for at least three different capsules or more in the set.

In a preferred mode, the flange-like rim of the capsule forms in cooperation with the centrifuging brewing device a restriction valve for the centrifuged liquid and the geometry of the rim differs in the set of capsules to adapt the back-pressure of said restriction valve for at least two different capsules of the set, preferably at least three different capsules.

Most preferably, the geometry of the rim differs in the set of capsules to adapt the back-pressure of said restriction valve for each type of capsule in the set.

The term "geometry" means here the specific shape and/or specific dimension(s) of at least a part of the rim.

The terms "different capsules", "sort of capsule" or "type of capsule" mean capsules having at least one difference, characterising beverages capable of delivering different attributes (aroma, intensity, crema/foam, flowtime, etc.), in any one of the following parameters: size of the capsule, amount of the substance, density of the substance, specific composition (e.g., blend, coffee origins), granulometry and combinations thereof.

The term "set of capsules" means a series of at least two, three, four, five, six capsules or more of different types.

The term "size of capsule" means in particular, the storage volume of the capsule potentially available for receiving the substance and/or the external volume of the capsule, e.g., of its body.

The term "back-pressure of the valve means" refers to the pressure loss created by the restriction or restriction valve. As the restriction or restriction valve form a "bottleneck effect", a pressure of liquid is created upstream of it by the effect of the centrifugation. Thanks to the restriction, the pressure before the restriction is increased, and it is this pressure which has an effect on the interaction (e.g. extraction) process of the liquid and the ingredients.

The preferably annular rim of the capsule having a pre-defined geometry forms with a dedicated pressing surface of the beverage production device a restriction valve means for the flow of beverage. Thereby, the rim is particularly configured to selectively block the flow path of the centrifuged liquid in order to delay its release from the capsule. More particularly, when a pressure threshold of the centrifuged liquid is reached at the valve means, i.e., the centrifuged liquid forcing against the rim of the capsule, the valve means opens, i.e., a restricted flow gap is provided by a pressing surface of the device moving relatively away from the rim of the capsule or vice versa, the rim of the capsule moving relatively away from the pressing surface or both. Before the threshold pressure of the centrifuged liquid is attained, the valve means remain closed. Hence, the rim blocks the flow-path for the centrifuged liquid.

It should be noted that the opening of the valve means depends on the rotational speed of the capsule, driven by drive means of the beverage production device. Therefore, as the valve means selectively block, or at least significantly restrict, the flow-path for the centrifuged liquid, a preliminary wetting step of the beverage substance, e.g., ground coffee, is carried out as no liquid is yet discharged from the device and the capsule fills with injected liquid. As a result of a prewetting and delayed release of the beverage, a thorough wetting of the substance is made possible and the interaction time between the liquid and the beverage substance, e.g., coffee powder, substantially increases and the brewing characteristics, e.g., coffee solid content and beverage yield, can be significantly improved.

Due to a specific geometry of the rim of the capsule, an adaptation of the back-pressure of the restriction valve is obtained. Thereby, in particular, the thickness of the valve portion of rim of the capsule, dedicated for engaging with a valve portion of the device, is varied in the set. Moreover, the thickness of the valve portion can be varied by a specific design of the rim of the capsule. The rim of the capsule may form a protrusion or a recession of variable thickness. For example, the rim of the capsule may have a cross-section of rectangular, triangular or dome shape, forming different thicknesses for at least two capsules of the set, preferably at least three different capsules.

Preferably at least the back-pressure exerted by a dedicated valve portion of the device onto the valve portion of the rim of the capsule can be adapted by means of the geometry, i.e., thickness, of the rim of the capsule. Accordingly, due to the adjustment of the back-pressure to different capsules, the flow rate and/or rotational speed can be varied accordingly to provide a wide range of different beverages. As a result, the strength, taste and/or crema, respectively foam, of the beverage can be controlled as a function of the type of capsule.

The rim of the capsules in the set can take various shapes. The rim preferably may comprise any cross-section which is formed over the whole circumference of the rim. The cross section may be plain or hollow. It may be a square, rectangular, triangular, circular, oval, etc. The rim of the capsule is preferably made of rigid material. Accordingly, the rim remains of a relatively constant dimension and geometry during the beverage preparation operations in the dedicated beverage preparation device in order for the rim to play its role of restriction of the beverage flow-path and to ensure a reliable opening. Accordingly, resilience of the rim which may lead to variances of the liquid pressure necessary to overcome the defined back-pressure of the pressing surface being exerted onto the rim is prevented.

In an alternative, the rim can also be made of a compressible material such as rubber, e.g., silicone. In this case, the resilience of the valve means can be taken, at least in part by the valve means.

In a preferred embodiment, the rim is made integral with the body of the capsule. Therefore, for essentially economical reasons, the sealing portion and the valve portion of the rim can be formed in one piece together with the cup-shaped body.

Moreover, the rim is preferably formed essentially perpendicular to the axis of rotation of the capsule when operated in the centrifugation device.

In another mode of the invention, the set of capsule comprises the valve means as a whole. In other words, the valve means is not obtained by the conjunction of a valve portion of the capsule and a valve portion of the capsule but it is obtained by portions of the capsule itself. An example of a capsule having the valve means, is described in WO2008/148604 which content is here included by reference. In the cited publication, the valve means is referred as an opening means which opens under the centrifugal effect to allow the brewed liquid to leave the capsule. The opening or valve means can comprise a resilient valve. For instance, the opening means comprises at least one radial deflecting lip integral to a wall of the capsule. For instance, a lid of the capsule is connected to a body and the deflectable lip is part of the lid. In the context of the present invention, the opening or valve means is configured to provide a closing pressure of the valve for the centrifuged liquid which varies for at least two capsules of the set, preferably at least three different capsules, and/or is configured to open to form a restriction area in the open configuration of the valve that differs for at least two capsules of the set. As a result the pressure loss created by the valve means differs for at least two capsules, and preferably three capsules or more of the set.

In another mode, the set of capsule are configured with a fixed flow restriction for the centrifuged liquid wherein the area of the flow restriction differs for at least two capsules of the set, preferably for each capsule of the set. As "fixed flow restriction", it is meant a flow restriction obtained by one or more radially oriented orifices of the capsule which creates a pressure loss under the Bernoulli equation. Therefore, the centrifuged liquid is forced to traverse such restriction path of the capsule thereby creating a certain backpressure in the capsule. Preferably, the fixed restriction is obtained by a series of restriction orifices which overall surface area differs for at least two capsules of the set. The restriction orifices may be provided a peripheral portion of wall of the capsule such as in the lid or sidewall of the capsule.

The different capsules in the set may comprise bodies of different storage volumes obtained by a variable depth of the body in the set but the same insertion diameter (D) for all capsules of the set. Thereby, the term 'insertion diameter' refers to a diameter of reference measured on the external surfaces of the body of the capsule.

Furthermore, the capsules in the set may as well be designed to contain different sorts of beverage substances whereby the size of the capsule body remains the same.

In a preferred embodiment, the capsules according to the system contain coffee powder of different sorts to produce coffee beverages having characteristics (strength, aroma, taste, crema, . . . ) and different volumes, e.g., 25, 40, 110, 250, 400 mL (e.g., ristretto, espresso, lungo, doppio, Americano, Long black coffee, etc) with preferably variable crema characteristics (volume and/or texture).

By "different sorts" of a beverage substance or coffee it is meant any difference regarding: weight in the capsule, grind size, tap density, roasting levels, origins, blends, nature of ingredients (coffee, tea, cocoa, additives, etc.) and combinations thereof.

Thereby, the thickness of the valve portion of the rim, as obtained by its particular design or otherwise, varies for at least two capsules of the set in order to set different back-pressures of the valve means when the capsule is engaged in the device, i.e., its valve portion being engaged by a valve portion or dedicated pressing surface of the device. As a result, the back-pressure on the centrifuged liquid is varied depending on the capsules inserted in the device. Depending on the rotational speed of the capsule in the device, the flow rate of the beverage is set as a function of the inserted capsule.

It can therefore be understood that the extraction conditions can thereby be controlled to induce a large number of different extraction-dependent quality characteristics (taste, aroma, colour, crema, etc.).

As a result, each capsule in the set can deliver beverages of different volumes and with different characteristics, whereby the back-pressure during the brewing process can be adapted to the specific beverage to be prepared by a particular capsule. Accordingly, a wide range of beverages can be prepared without the need of adapting the back-pressure by a force-set adjustment mechanism of the device itself since this is the capsule that sets such parameter when properly inserted in the device.

In a preferred embodiment, the valve portion of the rim of the capsule is preferably of variable thickness within at least two capsules of the set, more preferably at least three or more capsules of the set. Thereby, the particular thickness of the valve portion of the rim is preferably designed to be higher for capsules containing a smaller amount of coffee powder than for capsules containing a higher amount of coffee powder. A the same time, the rotational speed for capsules containing a smaller amount of coffee powder can be set higher than for capsules containing a higher amount of coffee powder.

For example, for smaller capsules and/or capsule containing a smaller amount of coffee powder, such as e.g. ristretto or espresso type capsules, a thicker and denser crema is desired which can be obtained by a relative higher back-pressure compared to larger capsules and/or capsules which contain a larger amount of coffee powder and from which larger coffee beverages are to be prepared such as e.g. lungo or Americano type coffee beverages.

In an alternative, the rotational speed can be set constant for at least two capsules, preferably three capsules or more in the set. In this case, the beverage flow rate is set by the backpressure created by the capsules only.

For example, in order to optimize extraction, a relative lower flow rate for a smaller coffee, e.g., ristretto coffee, might be desired than for a larger coffee, e.g., lungo, Americano, long black, etc. Accordingly, for capsules containing a higher amount of beverage substance, the back-pressure can be adjusted to a relative lower value in order to increase the flow rate compared to a capsule containing a relative lower volume of beverage substance.

Accordingly, in a preferred embodiment, the thickness of the valve portion of the rim varies as a function of the sort of capsule in the set in order to adjust the backpressure at the restriction valve.

In a preferred, but non exclusive, mode, the thickness of the valve portion of the rim increases when the amount of coffee powder decreases in the capsules and/or the size of the capsules decreases.

In another mode, the capsules have flow restriction orifices (i.e., replacing the valve means as aforementioned) which overall surface area increases in the set as a function of the increase of the amount of powder and/or size of capsule in the set. Therefore, the larger the capsule, the larger the flow area for the centrifuged liquid in the capsule and consequently the lower the backpressure exerted by the restriction orifices. Furthermore, the rotational speed is also set in the device to increase when the amount of coffee powder decreases in the capsules and/or the size of the capsules decreases.

In an alternative, the rotational speed can also be set constant as aforementioned when the amount of the amount of coffee powder decreases in the capsules and/or the size of the capsules decreases.

Furthermore, for all previously described modes, the rotational speed can also be set in the device to decrease when the amount of coffee powder decreases in the capsules and/or the size of the capsules decreases.

Conversely, for all previously described modes, the rotational speed can also be set in the device to increase when the amount of coffee powder decreases in the capsules and/or the size of the capsules decreases.

The capsules according to the system of the present invention may further comprise capsule identifying means associated to the different capsules in the set for adjusting at least one brewing parameter other than the back-pressure itself.

Preferably, the parameter adjustable by the capsule identifying means can be the rotational speed, the volume of liquid fed into the capsule, the injected liquid temperature, the pressure and/or flow rate of the liquid supply pump and any combinations thereof, the prewetting time at which a slow rotational or no speed is provided and combinations thereof.

Hence, the capsule identifying means also participate to deliver a wider range of beverages having differentiated characteristics (volume, taste, strength, crema, colour, etc.).

Moreover, these means enable to reduce the useful range of rotational speeds while maintaining a large range of flow rates (as obtained by the back-pressure settings) thereby conferring a simpler, cheaper, more reliable and less energy consuming system.

At the device side of the system, sensing means may be provided to identify the identifying means provided at the capsules. Thereby, the sensing means are associated to control means placed in the centrifugal brewing device for controlling the adjustment of the said brewing parameter(s).

The control means can be a control unit of the device which controls parameters selected amongst: the rotational speed of the motor driving the capsule in rotation, the water volume and/or water flow rate, water pressure as delivered by the water pump in the centrifuged capsule and combinations thereof.

In a mode, the identifying means comprise the geometry of rim—e.g. the thickness—that differs in the set of capsules.

In other words, the system identifies the capsule of the set by identifying the geometry, e.g., by sensing the thickness of the valve portion, and adjusting the brewing parameter(s), e.g. the rotational speed and/or volume accordingly. The adjustment of these parameters can be controlled automatically at predetermined values or be set accordingly within fixed ranges. When the adjustment is set at fixed ranges of parameters, the user is given the possibility to select the preferred values for these parameters within these ranges in order to customize the beverage according to his/her preferences. For this, the device comprises selection means, such as knobs and the like, to set precisely the values of these parameters within the fixed range.

Therefore, the sensing means of the device comprises means for sensing the back-pressure of the valve means as generated by the specific thickness of the valve portion of the capsules inserted in the device. The advantage is that no other identifying means are necessary at the capsule (e.g. barcode, RFID, etc.).

The sensing means of the device can be chosen amongst a pressure sensor and/or distance sensor. The pressure sensor can sense the pressure or force (e.g., pre-constraint) exerted by the capsule on the valve portion of the device or vice versa. The distance sensor can sense a variation of distance in the spring biasing valve means brought by the capsule. The distance sensor can be any suitable sensor such as optical, mechanical and/or electrical (e.g. capacitive).

Other identifying means of the capsule can be optical (e.g., 1D or 2D barcode), radio-frequency (e.g., RFID tag), magnetic (e.g., Hall Effect, inductive), capsule colour recognition or mechanical recognition means.

Other identifying means of the capsule can be the depth of the capsule which differs in the set and is sensed by mechanical, optical or electromechanical sensors such as described in co-pending patent application EP 10170042.5. For this, the device for sensing the capsule the device is characterized in that it comprises at least one means for sensing the relative position of an external surface of the capsule in the receptacle; said relative position being representative of the size of the receptacle when the capsule is arranged in the receptacle and means for providing a code which is related to the sensed relative position of said surface.

In the context of the invention, the cup-shaped body can comprise aluminium and/or plastics. The cup-shaped body can also be made of plastics only. The rim is preferably an integral part of the body. The capsule further comprises a lid membrane for closing the cup-shaped body. The lid membrane is preferably sealed onto the rim at a sealing portion of the rim.

The term "closing" in the context of the invention encompasses a configuration wherein orifices (e.g., flow restriction orifices or pores) are present in the lid. Therefore, closing does not necessarily limit to a liquid tight or gas tight configuration of closure of the lid with the body.

The capsule according to the present invention can be formed of gas barrier material and closed by the upper wall respectively membrane of the capsule in a gas impervious manner so that the freshness of the beverage substance, e.g., roast and ground coffee particles, is maintained for a prolonged period of time.

The membrane preferably comprises at least a peripheral perforable area neighbouring a sealing portion of the membrane which is sealed onto the flange-like rim of the body. Hence, the perforable area can be perforated by perforating means of the beverage production device for providing a series of liquid outlets in the capsule. Therefore, liquid being centrifuged in the capsule can leave the capsule via the series of outlets, then, it can exert pressure onto the rim of the capsule. The series of outlets, such as perforated orifices may be small enough to filter the liquid, e.g., coffee extract. When the opening pressure is reached, the valve means open forming a flow restriction gap and the liquid can be centrifuged outside of the capsule and be collected for being dispensed.

In a possible alternative, the capsule of the invention comprises a porous lid instead of a perforable membrane. The porous lid may be formed of paper, plastic and/or aluminium, bio-based materials, or any combinations of these materials. The cup-shaped body may also be formed of paper, cardboard, bio-based material or any combinations these materials.

Moreover, the capsule may as well be a re-fillable capsule having a lid member attached to the body of the capsule by means of e.g. a joint. Accordingly, the user may provide a beverage ingredient to the capsule according to his or her taste preferences.

In another possible mode, the capsule comprises an internal filter element inserted in the cup-shaped body. Moreover, a lid membrane covering the internal filter may close the capsule. The lid membrane can be perforable or peelable. For instance, the internal filter element can be a plastic piece with filtering holes or slots for filtering the centrifuged liquid such as described in WO 2008/148646.

The capsule according to the present invention can comprise a substance which is extractable, such as ground coffee or a soluble or dispersible substance in liquid, such as milk or soup powder. In particular the substance can be chosen amongst ground coffee, instant coffee, chocolate, cocoa powder, leaf tea, instant tea, herbal tea, a creamer/whitener, a nutritional composition (e.g., infant formula, growing-up milk powder, gums), dehydrated fruit or plant, culinary powder and combinations thereof.

The capsule may include a gas with the food ingredients such as nitrogen and/or carbon dioxide.

Preferably, the capsule comprises gas barrier materials enveloping the ingredients' compartment. However, in case the capsule is not gastight 'per se', an outer package can be used to pack the capsule individually or in group of several capsules. In this case, the package is removed before the capsule is inserted in the device.

In a preferred embodiment, the pressing surface of the valve portion of the dedicated beverage production device to be used in conjunction with the capsule according to the present invention forms a relatively flat annular surface onto which the valve portion of the rim of the capsule can press. Hence, a closing action is promoted by an engagement at the valve means under the form of an annular sealing line or surface. Preferably, the pressing surface is substantially parallel to the valve portion of the flange-like rim. Of course, the pressing surface could also have a slightly concave or convex line of curvature in radial direction relative to the axis of centrifugation.

It should be noted that the valve portion of the dedicated beverage production device is preferably associated to spring-loading means for enabling the opening of a flow restriction gap for the centrifuged liquid by the pressing surface moving relatively away from the rim of the capsule. It should be noted that the flow restriction gap can be opened between the pressing surface and the capsule by a relative movement between each other. This relative movement can be obtained by either the pressing surface moving away from the capsule or the capsule moving away from the pressing surface such as by the capsule holder being the mobile element. A third option is to have both the pressing surface of the injection head and the surface supporting the capsule holder to move against the force of a spring-biasing means.

The invention also relates to a set of different capsules, each of the capsules for selectively delivering a beverage in a beverage producing device by centrifugation of the capsule,
  each capsule containing at least one beverage substance,
  each capsule of the set comprising a body having an enclosure containing the beverage substance, an upper wall for closing the body and a flange-like rim,
  wherein the capsules comprises a rim with at least one portion of it having a thickness which differs for at least two capsules of the set, preferably at least three capsules of the set, in order to adjust the backpressure or back-force of spring biasing means of the device onto the portion of the capsule when the capsule is engaged in the beverage production device.

The set of different capsules comprises all the possible characteristics of capsules described before and after in the description.

In a further aspect, the present invention proposes a method for preparing a beverage by a beverage production system comprising a set of different capsules designed for being inserted in a dedicated beverage production device of the system for forming alone or in combination with the device a restriction and/or restriction valve for the centrifuged liquid, the method comprising the following steps:
  inserting a capsule of the set in the beverage production device and centrifuging the capsule by the device,
  wherein during brewing, a backpressure is opposed to the centrifuged liquid by the restriction or restriction valve which differs for at least two capsules of the set, preferably at least three capsules of the set.

In a preferred mode, the method comprises:
  engaging the valve portion of said capsule with a valve portion of the beverage production device for exerting a predefined pressure threshold at the valve means for blocking and/or limiting the flow of the centrifuged liquid until the pressure is overcome by the centrifuged liquid, and
  setting the back-pressure of the restriction valve as a function of the type of capsule inserted in the device by varying the thickness of the valve portion of the capsule in the set of capsules.

In a preferred embodiment, the method further comprises providing different values of the thickness of the valve portion of rim between 0.2 and 10 mm in the set, more preferably between 0.5 and 3 mm. In a practical example, the set of capsules comprises at least three types of capsules having rim thicknesses of respectively: 1.0, 1.4 and 1.8 mm.

Furthermore, the method comprises rotating the capsule in the device at a rotational speed determining the flow rate of centrifuged liquid through the valve means in function of the back-pressure set by the capsule engaged in the device.

Preferably, the back-pressure (i.e. the pressure above the atmospheric pressure) exerted by the restriction or valve means can range between 5 N/cm$^2$ (0.5 bar) and 180 N/cm$^2$ (18 bar), more preferably between 15 N/cm$^2$ (1.5 bar) and 134 N/cm$^2$ (13.4 bar), most preferably between 27 N/cm$^2$ (2.7 bar) and 87 N/cm$^2$ (8.7 bar) depending on the type of capsule.

The restriction created by the valve in the open configuration or by orifice(s) is preferably controlled by design of the capsule and/or device to be comprised between 0.5 and 4.0 mm$^2$, more preferably between 0.75 and 3.0 mm2, most preferably between 1.0 and 2.5 mm$^2$, for example, at about 1.7 mm$^2$.

The rotational speed is preferably controlled between a range of from 2000 and 16500 rpm, most preferably between 4000 and 10000 rpm. For at least two capsules of the set, preferably for at least three capsules of the set, at least one rotational speed is different during centrifugation of the liquid in the capsule, within the controlled range.

The flow rate is preferably controlled to range between 0.1 and 10 ml/seconds, more preferably between 0.5 and 3.5 ml/seconds. Again for at least two capsules of the set, preferably for at least three capsules of the set, at least one flow rate is different during centrifugation of the liquid in the capsule.

The method according to the invention enables to adjust the beverage characteristics, in particular, the aroma intensity and crema quality and quantity of a specific beverage. Thereby, for example, the back-pressure for ristretto and espresso type coffee beverages can be set higher than for lungo-type or Americano-type beverages. Furthermore, for lungo type coffee, a flow rate higher than for ristretto and espresso type coffee beverages may also be desired.

The setting of the back-pressure by adaptation of a differentiated capsule's design of the system constitutes a built-in solution by contrast to a solution where a spring load of a dedicated enclosing member enclosing the capsule in a device has to be externally manipulated for each beverage preparation in which a beverage of different nature is to be prepared. Hence, a more convenient and reliable adjustment of the back-pressure during beverage brewing is enabled.

In a further aspect, the present invention relates to the use of a variation of the geometry of the valve portion of a rim of a capsule in order to adapt at least one brewing parameter of a beverage prepared in a centrifugal beverage preparation device during the beverage preparation process dependent on the type of capsule.

BRIEF DESCRIPTION OF THE DRAWINGS

Further features, advantages and objects of the present invention will become apparent for a skilled person when reading the following detailed description of embodiments of the present invention, when taken in conjunction with the figures of the enclosed drawings.

DETAILED DESCRIPTION OF THE FIGURES

Figure 1A:
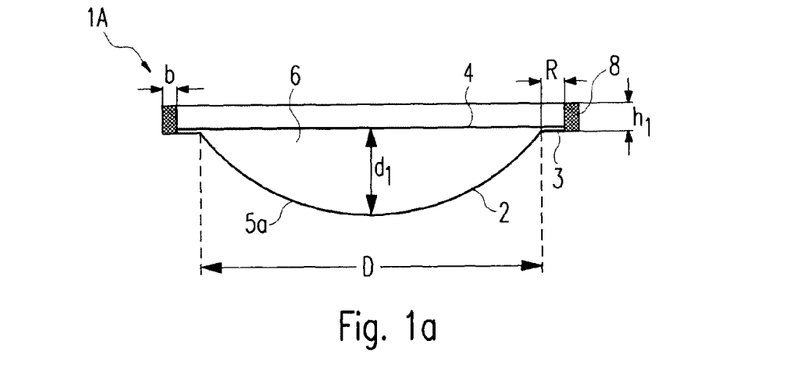
FIG. 1a-1c are cross sectional side views of different embodiments of a capsule having different sizes according to the invention and a variation of height of their rim.
Figure 1B:
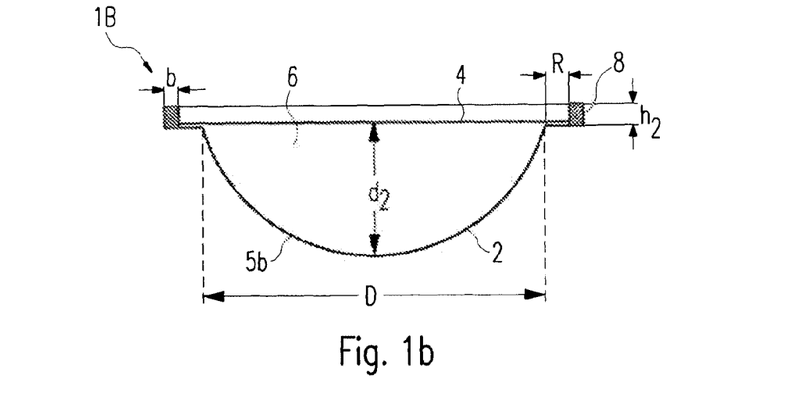
Figure 1C:
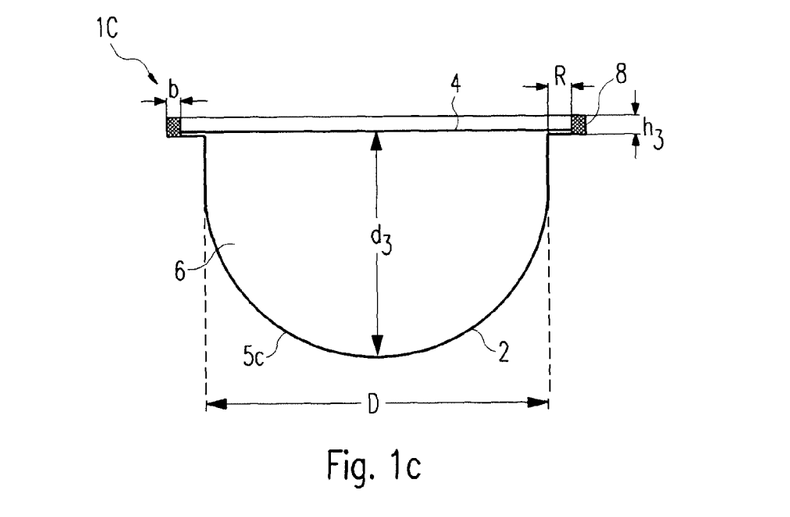

FIGS. 1a, 1b and 1c relate to a preferred embodiment of a set of capsules 1A, 1B, 1C according to the invention. The capsules preferably comprise a body 2, a rim 3 and an upper wall member respectively a perforable membrane 4. Thereby the membrane 4 and the body 2 enclose an enclosure respectively ingredients compartment 6. As shown in the figures, the membrane 4 is preferably connected onto an inner annular portion R of the rim 3 that is preferably between 1 to 5 mm. The membrane 4 is connected to the rim 3 of the body by a seal such as a heat or ultrasonic weld line.

The rim is not necessarily horizontal as illustrated. It can be slightly bended in order to increase the resistance of the seal to the increasing pressure pushing on the membrane with time, due to degassing of the capsule ingredient with time.

Figure 3:
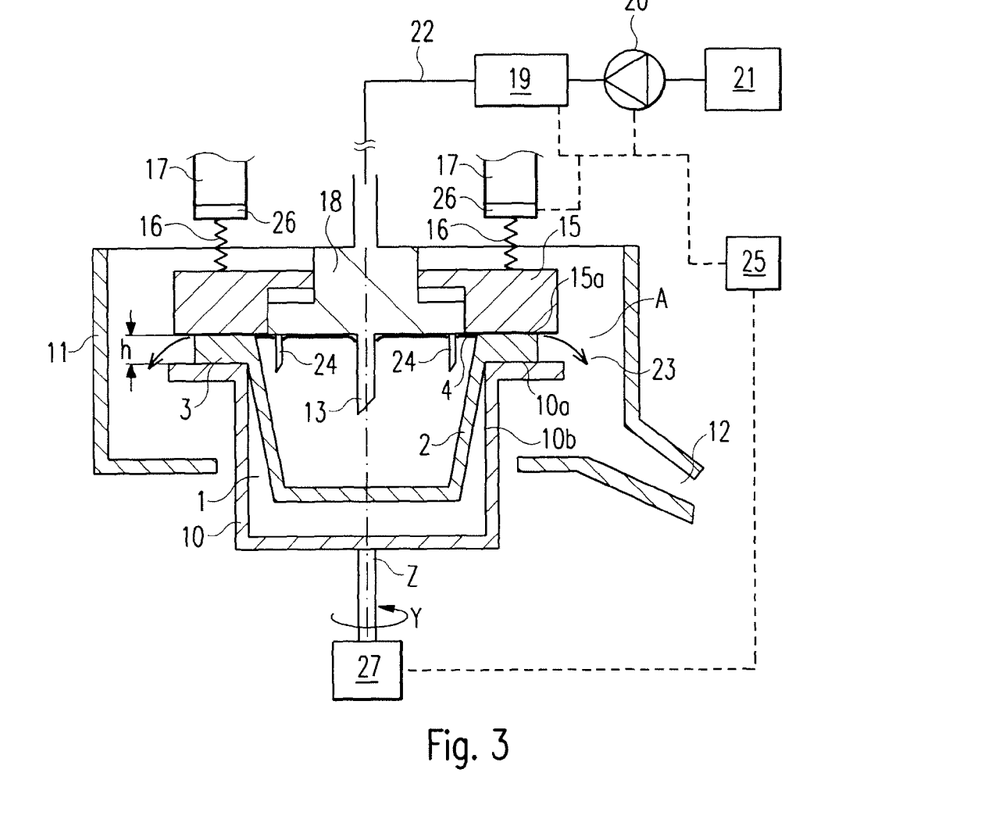
FIG. 3 is a schematic representation of the centrifugal device into which is inserted a capsule according to the invention, wherein the back-pressure is exerted by spring loading means.

The rim 3 of the capsules preferably extends outwardly in a direction essentially perpendicular (as illustrated) or slightly inclined (if bended as aforementioned) relative to the axis of rotation Z of the capsule 1 (see FIG. 3). Thereby, the axis of rotation Z represents the axis of rotation during centrifugation of the capsule in the brewing device.

It should be understood that the shown embodiment is just an exemplary embodiment and that the capsule 1 in particular the capsule body 2 according to the invention can take various different embodiments.

The capsules 1A, 1B, 1C are preferably single-use capsules. However, it should be noticed that the capsules can deliver more than one beverage at a time, for example, a volume of coffee extract sufficient for filling two cups at a same time.

The body 2 of the respective capsule has a single convex portion 5a, 5b, 5c of variable depth, respectively, d1, d2, d3. Thereby, the portion 5a, 5b, 5c may as well be a continuously truncated or a partially cylindrical portion.

Hence, the capsules 1A, 1B, 1C preferably comprise different volumes but a same insertion diameter 'D'. The capsule of FIG. 1a shows a small volume capsule 1A whereas the capsule of FIG. 1B and 1C show a larger volume capsule 1B respectively 1C. The insertion diameter 'D' is hereby determined at the line of intersection between the lower surface of the rim 3 and the upper portion of the body 2. However, it could be another referencing diameter of the capsule in the device.

The body 2 of the capsules is preferably rigid or semi-rigid. It can be formed of a food grade plastic, e.g., polypropylene, with a gas barrier layer such as EVOH and the like or aluminium alloy or a laminate of plastic and aluminium alloy. The membrane 4 can be made of a thinner material such as a plastic film also including a barrier layer or aluminium alloy or a combination of plastic and aluminium alloy. The membrane 4 is usually of a thickness between 10 and 250 microns, for example. The membrane is perforated for creating the water inlet as will be described later in the description. The membrane also further comprises a perforable peripheral area.

Instead of the membrane 4, the capsules 1A, 1B, 1C may as well comprise a rigid or semi-rigid lid member which preferably has the form of a disk of plastic comprising a central portion having an inlet port for enabling the introduction of a water injection member and/or a peripheral portion having circumferentially arranged outlet openings.

The volume difference between the small and large capsules is obtained particularly by varying the depth (d1, d2, d3) of the body 2 of the capsules in the set. In particular, the depth of the body of the smaller capsule 1A is lower than the depth of the body of the larger capsules 1B, 1C.

Of course, an equivalent (not illustrated) mode to obtain different volumes would be to vary the bottom shape of the capsule or other dimensions of the capsule, e.g., its diameter.

The small volume capsule 1A preferably contains an amount of extraction ingredient, e.g., ground coffee, smaller than the amount for the large volume capsules 1B, 1C.

Hence, the small capsule 1A is intended for delivery of a short coffee of between 10 mL and 60 mL with an amount of ground coffee comprised between 4 and 8 grams. The larger capsules 1B is intended for delivery of a medium-size coffee, e.g., between 60 and 120 mL and the largest capsule is intended for delivery of a long-size coffee, e.g., between 120 and 500 mL. Furthermore, the medium-size coffee capsule 1B can contain an amount of ground coffee comprised between 6 and 15 grams and the long-size coffee capsule 1C can contain an amount of ground coffee between 8 and 30 grams.

In addition, the capsules in the set according to the invention may contain different blends of roast and ground coffee or coffees of different origins and/or having different roasting and/or grinding characteristics.

As indicated in FIGS. 1a to 1c, the geometry of the rim may be adapted to comprise, for example, a L-shaped cross section having an annular outer protrusion 8 formed in a direction perpendicular to a plane in which the membrane 4 is arranged. Thereby, the thickness h1, h2, h3 of the rim 3 is preferably adapted to the amount and/or characteristics of the beverage substance contained by the shown capsules 1A, 1B, 1C in order to enable an adjustment of the back-pressure exerted onto the capsule when being enclosed by a dedicated enclosing member 15 of a beverage production device.

In particular, for capsules containing a small amount of beverage substance—e.g. capsule 1A—in order to prepare e.g. a ristretto or espresso coffee beverage, a slow extraction might be desired for providing the coffee with a high intensity (i.e., a large amount of total coffee solids transferred in the coffee extract) and a thick crema. These characteristics can be compared to a faster extraction which might be desired for the beverage coming out of capsules 1B or 1C containing a larger amount of coffee powder. Therefore, for a given rotational speed during the beverage extraction, the back-pressure of a capsule 1A of a smaller volume containing a smaller amount of substance is to be adapted to be higher than the backpressure of larger capsule 1B or 1C containing a higher amount of substance. Accordingly, the indicated thickness h1 of the valve portion 8 of the rim for capsule 1A is chosen to be higher than the indicated thickness h2 respectively h3 for capsules 1B respectively 1C. Hence, the thickness h of the respective capsules 1A, 1B, 1C is adapted to increase as a function of the volume of capsules and/or the amount of beverage substance contained within the respective capsules.

For example, for smaller-size capsules as indicated by FIG. 1a, the thickness h1 is preferably chosen to be between 1.0 and 2.5 mm. For bigger-size capsules as indicated by FIGS. 1b and 1c, thickness h2 respectively h3 is preferably chosen to be between respectively 0.8 and 1.8 mm and between 0.5 and 1.5. Of course such values can differ greatly depending on the configuration of the valve means, in particular, on the device side.

However, as will be later explained with reference to FIG. 4 below, it is to be noted that the thickness may as well decrease as a function of the volume of beverage substance contained within the capsule, dependent on the force loading means exerting a predefined force on the rim 3 respectively the protrusion 8 of the capsule 1 when the capsule is enclosed in a beverage production device (cf. FIGS. 3 and 4).

Furthermore, it is to be noted that force generating means are provided in the device can be made non-adjustable in order to not change the applied force onto an enclosing member exerting a back-pressure onto the rim of the capsule once the capsule is engaged in the device.

Accordingly, an adaptation of the applied back-pressure is preferably solely done by means of the variation of the geometry of the rim of the capsule.

As shown in FIGS. 1a to 1c, the width b of protrusion 8 delimits radially the valve portion of the rim. It is preferably of equal value for the different embodiments of the capsules 1A, 1B, 1C of the set.

It is to be understood that the thickness (h1, h2, h3) of the rim 3 respectively the annular protrusion 8 of a specific capsule may not only be adapted with regard to the volume, but also with regard to the nature of the beverage substance (e.g., amount, density, composition, etc.) contained within the capsule such that the back-pressure resulting when the rim 3 of the capsule is engaged with a portion of valve of the dedicated device, is adjusted to a desired value.

Figure 2A:
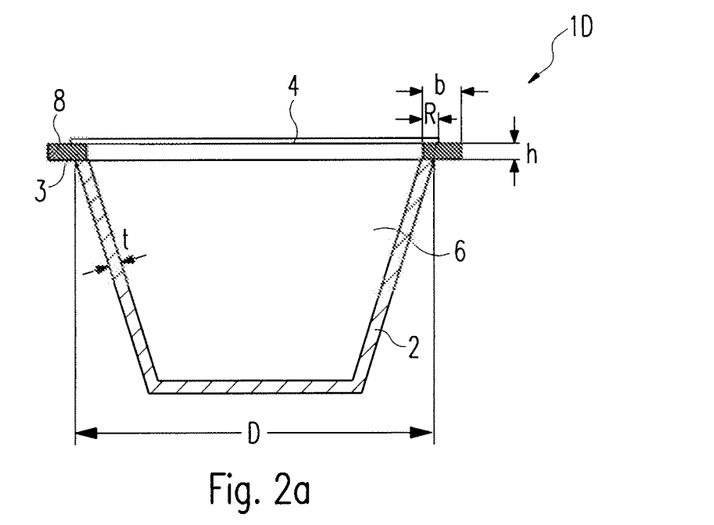
FIGS. 2a and 2b are cross sectional side views of further embodiments of a capsule of the system having a rim portion of different configuration.
Figure 2B:
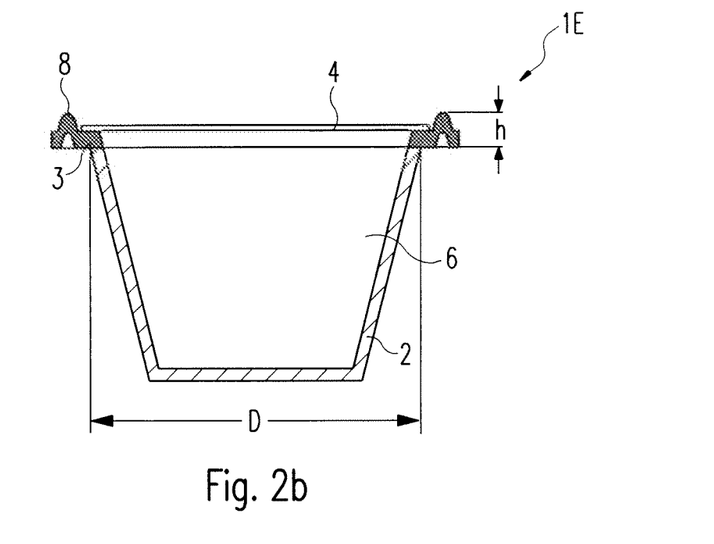

FIGS. 2a and 2b relate to further preferred embodiments of the capsules according to the present invention. Thereby, the shown embodiments of the capsules 1D and 1E preferably comprise the same diameter D as capsules 1A, 1B, 1C.

As shown in FIG. 2a, the capsule 1D is of frusto-conical form comprising a body 2 having a preferably constant wall thickness t. Thereby, the rim 3 of the capsule is formed integral with the body 2. As indicated in the figure, rim 3 of the capsule is preferably of essentially rectangular cross section of thickness h and width b. Thereby, thickness h and/or width b are preferably adapted to the type of capsule. Thickness h may be different of the preferably constant wall thickness t of the capsule.

In the shown embodiment, the membrane 4 is sealed to an annular portion R on the upper surface of rim 3 of the capsule. However, the membrane 4 may as well be sealed to the complete upper surface of rim 3 such that portion R equals width b.

FIG. 2b shows a further capsule 1E of a set of capsules according to the present invention. In this embodiment the geometry of the rim 3 is adapted to have a central essentially embossed protrusion 8 protruding above the sealing plane of the upper wall 4 on the rim.

In the context of the invention, the thickness "h" (or "h1", "h2", "h3", etc.) is measured from the lower surface of the rim 3 to the highest point of the rim, i.e., when an extension is provided from the highest point of the extension 8 of rim 3.

The thickness is anyway the effective distance which is adapted to adjust the back-pressure during the beverage extraction process by insertion of the capsule in the device as will be further explained.

As illustrated with regard to FIGS. 1a to 1c and 2a and 2b, the capsule rim portion 3 may take various geometrical designs in order to influence and adapt at least one brewing parameter during the beverage extraction process.

FIG. 3 shows a sectional side view of a device according to the system of the invention in a closed state thereof.

Thereby, the device comprises a rotating capsule holder 10, a driving means 27, and a collector 11 onto which the centrifuged liquid impacts and drained through a beverage outlet 12. The driving means 27 can be a rotary motor which is linked to the capsule holder 10 at the bottom side (as illustrated) or top side (not illustrated).

Furthermore, the device comprises water injection means 18 having an injection member 13 being arranged to pierce the membrane 4 of the capsule 1 in a central portion thereof. The injection means 18 preferably also comprise a series of outlet perforators 24 as described in WO2008/148604. Accordingly, outlets are produced in an annular portion of the membrane 4 which enable an extracted beverage to leave the capsule 1 during the rotational movement thereof. The injection means 18 are connected to liquid circuit 22 comprising a liquid supply 21, a pump 20 and heating means 19 for providing a predefined volume of heated pressurized liquid to the capsule 1 during the beverage extraction process.

The device further comprises a valve portion 15 which is arranged circumferentially to the water injection unit 18 and which has a lower annular pressing surface 15a.

The valve portion 15 and the injection unit 18 are preferably movable with respect to the capsule holder 10 in order to enable an insertion and ejection of the capsule 1 to and from the capsule holder 10 before respectively after the beverage extraction process.

Moreover, the water injection means 18, the valve portion 15 and the capsule holder 10 are rotatable about axis Z.

The valve portion 15 is also made moveable independently from the injection unit 18 to take into account the different possible thicknesses of the capsules without affecting the relative position of the injection portion when engaged against the capsule. For this, portion 15 can be slidably mounted about injection unit 18.

In open configuration of the valve, a relatively small flow restriction is created, between the surface 15a and the valve portion 8 of the rim, that enables to force the flow of centrifuged liquid into a narrow jet of liquid projected onto the impact surface 11 of the device. The restriction forms an annular opening of surface area preferably comprised between 1.0 and 10.0 mm². The surface area of the flow restriction can vary depending on the set backpressure value in the valve by the capsule and the rotational speed of the capsule wherein in general the higher the speed, the larger the surface area.

The capsule holder 10 has an inner circumferential surface 10b that forms a referencing diameter substantially equal to diameter 'D' of the capsule 1 so as to ensure a tight fit of the capsule in the capsule holder 10 without possible radial play.

The capsule holder 10 is preferably hollow or deep enough at its centre to be able to accommodate all capsules of the set. Accordingly, a unique capsule holder is sufficient to receive all the capsules 1A, 1B, 1C, 1D, 1E of the set. The shown collector 11 terminates by a beverage outlet 12 such as formed as at least one open duct directed to one or more cups to collect the prepared beverage.

It should be noted that the capsule holder can take various shapes and may also be formed of a simple annular hollow ring. Of course, the capsule holder may be replaceable by a different capsule holder such as to better adjust to the different sizes or shapes of capsules or to adjust to a wider range of size and/or shapes.

The capsule 1 also lies solidly on its rim 3 onto an upper flange 10a of the capsule holder 10 without the body 2 substantially deforming radially. In this configuration, the water injection unit 18 and the valve portion 15 are engaged against the membrane 4 and rim, respectively. The system thereby forms a valve 23 by engagement of the valve portion 15 of the device and valve portion 8 of the capsule.

The valve 23 is designed to close under the force of a resilient closure load obtained by a load generating system 16, 17 comprising a preferably spring-biasing element 16. The spring-biasing element 16 applies a predefined resilient load onto the enclosing member 15. The load primarily distributes itself along the pressing surface 15a of the valve portion 15 acting in closure against the annular surface of the valve portion of rim 3. Such surface may also be a simple annular contact line. Therefore, the valve 23 normally closes off the flow path for the centrifuged liquid until a sufficient pressure is exerted on the upstream area of the valve by the centrifuged liquid exiting through the orifices created by the perforating elements 24. It should be noted that the valve of the device can be designed as a single rubber-elastic member which combines the spring-biasing function and the pressing surface 15a. It should be noted that a small liquid leakage through the valve means 23 may be required that helps vent the gas or air contained in the capsule during the filling of the capsule with liquid (not shown). This leakage may be obtained by small radial grooves or orifices provided in any of the valve portions (portion 15 of the device and/or rim 3 of the capsule). The leakage may also be obtained by small embossments on the membrane 4 to create a leak. The small embossments could be on the surface of the valve portion 15. The liquid flows thus between the membrane 4 and the valve portion 15 and forces the valve 23 to open by pushing the whole enclosing member 15 upwards against the force of the spring-biasing element 16. The centrifuged liquid can thus transverse the restriction created between the surface 15a of the portion 15 and the upper surface or line of the rim 3 or protruding portion 18. The liquid is thus ejected at a high velocity against the collector 11 as indicated by arrow A in FIG. 3 or another vertically oriented annular wall of the device placed between the collector and the valve 23 (not shown).

Thereby, extraction of the beverage out of the capsule 1 is obtained by driving the injection unit 18, the valve portion 15 and the capsule holder 10 together with the capsule, in rotation (Y) about axis Z, at an extraction speed, e.g., between 500 and 16500 rpm. The rotation is driven by a rotational motor 28 connected to at least the capsule holder 10 or injection unit 18. Hence, during operation of the capsule 1 placed into the system according to the invention, the capsule 1 is rotated about its axis Z. Thereby, liquid which is centrally injected into the capsule 1 would tend to be guided along the inner surface of the side wall of the body 2, up to the inner side of the membrane 4, and then through the perforated outlet filtering openings created in the membrane 4 by the perforating members 24. Due to the centrifugation of the liquid in the capsule 1, the liquid and the ingredients or substance provided within the capsule are made to interact in order to form a liquid comestible (e.g., liquid extract).

It is to be understood that the force acting on the rim 3 of the capsule 1 by pressing surface 15a can be adjusted by the geometry of the rim 3 such as e.g. the thickness h of the rim 3. Hence, in particular the exerted back-pressure acting on the rim 3 can be adjusted by adapting the thickness h of the rim 3 to predefined values thereof. Thereby, a higher back-pressure can be obtained by a larger thickness h, since this leads to a higher compression of the spring biasing element 16 which then exerts a higher force onto the pressing surface 15a. Correspondingly, a lower value for thickness h leads to a lower compression of the spring biasing element 16 and thus, to a relative lower force acting on the pressing surface 15a, so a lower back-pressure. Hence, the thickness h is preferably designed to increase for obtaining a resulting higher back-pressure.

Accordingly, in a simple mode of the invention, due to a particular adjustment of the back-pressure, as described, the resulting flow rate is set e.g. dependent on the type of capsules (e.g., 1A, 1B or 1C) inserted in the device.

Thereby, the present invention constitutes a built-in solution according to which the spring load of the enclosing member 15 enclosing the capsule 1 in a device does not have to be externally manipulated for each beverage preparation procedure in which a beverage of different nature is to be prepared. Instead, the spring load is preferably held at a constant predefined value in order to enable an accurate adjustment of the back-pressure by means of the variation of the geometry of the rim 3 of the capsule. Hence, a more convenient and reliable adjustment of the back-pressure onto the capsule during beverage brewing in a system according to the present invention is enabled.

In a more sophisticated mode of the invention, the capsule 1 may as well include identifying means to control brewing parameters and/or interact with the beverage production device.

Thereby, the identifying means preferably enable to provide information about the type of capsule engaged in the beverage production device. Accordingly, brewing parameters the volume and/or the rotational speed at which the beverage is prepared may be automatically adjusted by the device dependent on the provided information of the capsule. Customization options may also be provided to the user for enabling the modification by the user of certain extraction parameters within given ranges.

In a preferred embodiment, the portion of valve of rim 3 of the capsule 1 may be designed to form an identifying means that provides a discriminable information to the device as a function of its geometry, e.g., its particular thickness. Thereby, the device preferably comprises sensing means 26 designed to interact with the identifying means of the capsule.

As illustrated in FIG. 3, the sensing means 26 of the device can be a pressure sensor connected to the load generating means 16, 17 of the device. The sensing means 26 are preferably connected to a control means 25 of the device in order to provide information related to the present back-pressure acting onto the rim 3 of the engaged capsule, i.e., pressure or force value. Thereby, the control means 25 are preferably connected to at least the drive means 27, the pump 20 and the heating means 19. Thus, the brewing parameters such as the rotational speed of the motor 27, the temperature, the pressure and/or the volume of the liquid provided to the capsule during the beverage production process may be adjusted dependent on the provided information of the sensing means 26. In particular, the thickness h of the rim 3 is designed to vary the resulting back-pressure of valve 23 in order to adapt the brewing parameters of the particular beverage to be prepared. Furthermore, in function of the sensed information by the pressure sensors 26, the rotational speed is adjusted at the desired value that corresponds to a desired flow rate. As a result, different speeds or speed ranges can be selected as function of the sensed information by the sensing means 26. Selection of the speed is provided in the control unit 25 which controls in return the rotary motor 26 and if necessary the flow rate of the pump 20 to ensure sufficient supply of liquid in the capsule as a function of the selected speed.

In a different mode (not illustrated), the pressure sensing means can be replaced by one or more distance sensors. For example, the thickness h of the rim can be sensed directly or indirectly. For example, the length variation of the load generating means 16, 17 (e.g. spring length) can be sensed by distance sensor and provided as information to the control unit 25 for adjusting the brewing parameters, e.g., the rotation speed and/or volume of injected liquid.

Figure 5:
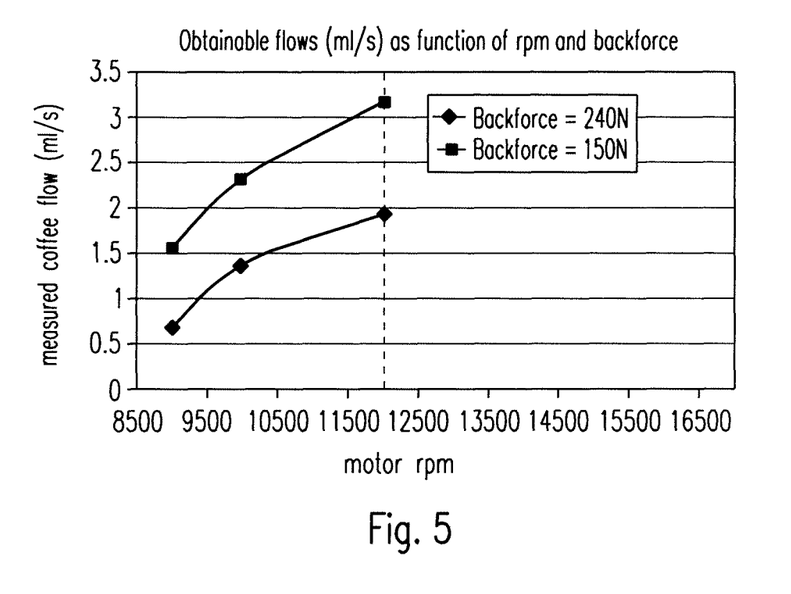
FIG. 5 is a graphical representation of the coffee flow rates obtainable with two different capsules providing different back-pressures as a function of the rotational speed of the capsule in the centrifugation device.

The flow control principle of the invention is illustrated in FIG. 5. The graphic illustrates the evolution of the beverage flow rate, e.g., coffee flow rate, (in mL/sec) as a function of the rotation speed of the motor (in rpm) for two different capsules (i.e. backforces). The backforce is here the force exerted by the annular pressing surface 15a, due to the compression of the spring loading member 16 of the device, onto the capsule's rim contact surface of portion 8 considering that the pressing surface in contact with the contact surface of portion 8 represents about 186 mm². The lower curve represents a capsule setting a backforce of 240 Newton (or a backpressure of 1.29 Mpa or 12.9 bar). The upper curve represents another capsule with a smaller thickness of its portion 8 setting consequently a lower backforce of only 150 Newton (or a backpressure of 0.819 Mpa or 8.19 bar). It is apparent that the flow rate can be set within a large range, e.g., 0.5 to 3.5 mL/sec for both capsules while maintaining a relatively narrow range of rotational speed, i.e., 9000 to 12000 rpm. If only a single capsule would be utilized providing a single backforce of 150 Newton, the same flow range would be covered only with a much larger range of speeds, i.e., between 9000 and more than 16500 rpm. Therefore, the invention provides larger opportunities of tailoring beverage characteristics with a much larger range of flow rate. In particular, one advantage can also be to reduce the useful speed range while maintaining the opportunity to deliver beverages within a larger range of flow rate.

Figure 4:
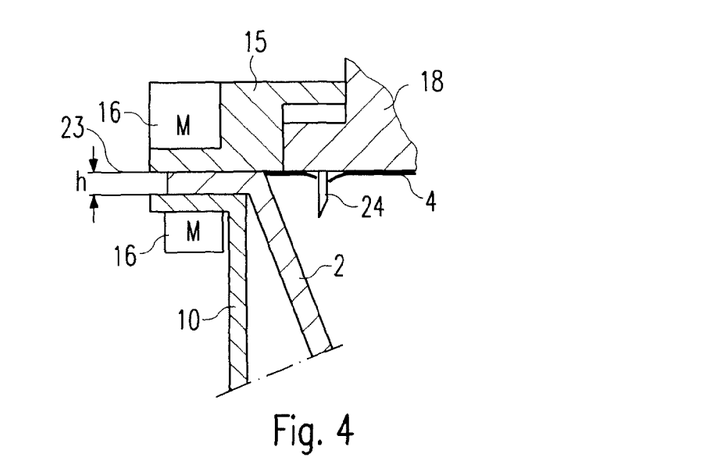
FIG. 4 is a sectional side view of the centrifugal device into which is inserted a capsule according to the invention, wherein the back-pressure is exerted by magnetic means.

FIG. 4 relates to another preferred embodiment of a device according to the present invention showing a sectional side view of the valve means 23 constituted by the rim portion 3 enclosed by the capsule holder 10 and the valve portion 15 of the device. Thereby however, the obtained back-pressure is obtained due to load generating means 16 which in this embodiment comprise two magnets M arranged in the valve portion 15 and the capsule holder 10 respectively. Thereby, the magnets M may be circumferentially arranged about axis Z of the device (see FIG. 3) in order to enable a uniform force distribution between the enclosing member 15 and the capsule holder 10 enclosing the rim 3 of the capsule.

By contrast to the shown embodiment according to FIG. 3, it is to be noted that the resulting back-pressure decreases for an increasing thickness h of the rim 3, since the attracting forces between the two opposed magnets M decrease if the distance between the magnets is increased. This has to be considered for the design of the height h of the rim. Hence, in such an embodiment, the height h is decreased in order to obtain a higher resulting back-pressure acting between the enclosing member 15 and the capsule holder 10 respectively the rim 3 of the capsule 1.

In other possible mode of the invention (non illustrated), the valve as obtained by the cooperation of the capsules and device can be replaced by a valve as part of the capsule only. In this case, the valve is geometrically designed for at least two types of capsules, preferably each type of capsules of the set, to provide different backpressures for the centrifuged liquid.

In another possible mode of the invention (non illustrated), the backpressure is obtained by a fixed restriction such as by at least one, but preferably a plurality of radially positioned outlet orifices provided through the capsule, whose total opening surface area varies in function of the type of capsule in the set. The restriction orifices provide a backpressure which is function of the number of outlet orifices and the individual opening section of each orifice. For instance, orifices can be provided along a circular path through the upper wall of the capsule or an annular path through the sidewall of the capsule. The total surface area of the flow restriction can represent between 0.5 and 5.0 mm², more preferably between 0.75 and 3.0 mm2, most preferably between 1.0 and 2.5 mm², for example, at about 1.7 mm². The number of outlet orifices for creating the flow restriction in the periphery of the capsule can range of from 1 to 300, more preferably between 3 and 150. For example, a first capsule comprises a flow restriction formed of 10 orifices of each 0.2 mm² and a second capsule with a flow restriction of 15 orifices of each 0.2 mm². In another mode, a first capsule comprises a flow restriction formed of 10 orifices of each 0.2 mm² and a second capsule with a restriction of 10 orifices of each 0.25 mm². The first capsules provide a function of flow rate to pressure which differs from the second capsules. In particular, due to a lower total surface area of their restriction, the first capsules provide a higher backpressure for the centrifuged liquid than the second capsules. The rotational speed can be controlled at specific values to ensure a flow rate for the first and second capsules that corresponds to the characteristics of the beverage to be produced. Of course other capsule types can be designed in the set of capsules to ensure other different backpressure characteristics.

Although the present invention has been described with reference to preferred embodiments thereof, many modifications and alternations may be made by a person having ordinary skill in the art without departing from the scope of this invention which is defined by the appended claims.

The invention claimed is:

1. A set of capsules for preparing beverages by centrifugation of a capsule in a centrifuging brewing device comprising:
    a set of individual capsules each for selectively delivering a beverage, each capsule containing at least one beverage substance;
    each capsule of the set comprising a body having an enclosure containing the beverage substance and an upper wall for closing the body;

each capsule includes a flange-like rim designed to form, in cooperation with the centrifuging brewing device, a restriction valve for the centrifuged beverage coming out of the capsule;

the geometry of the rim differs in each capsule to form, alone or in cooperation with the centrifuging brewing device, a restriction or restriction valve for the centrifuged beverage to adapt the back-pressure of the restriction valve for at least two capsules of the set.

2. The set of capsules according to claim 1, wherein the thickness of the valve portion of the rim varies in the set of capsules to adapt the back-pressure of the valve when it is engaged with a valve portion of the beverage production.

3. The set of capsules according to claim 1, wherein the rim is formed integral with the body of the capsules in a direction essentially perpendicular or slightly inclined relative to an axis of rotation of the capsule.

4. The set of capsules according to claim 1, wherein the capsules contain different types of beverage substances.

5. The set of capsules according to claim 1, wherein the capsules comprise a rim.

6. The set of capsules according to claim 1, wherein the capsule is designed to form a fixed flow restriction for the centrifuged liquid wherein the area of the flow restriction differs for at least two capsules of the set.

7. The set of capsules according to claim 1, wherein the capsules comprise an identifying member to interact with a beverage production device.

8. The set of capsules according to claim 7, wherein the identifying member allows the control of parameters selected from the group consisting of the rotational speed of the motor driving the capsule in rotation, the water volume and/or water flow rate, water pressure as delivered by the water pump in the centrifuged capsule and combinations thereof.

9. The set of capsules according to claim 7, wherein the identifying member comprises the geometry of a rim of the capsule that differs in the set of capsules.

10. A set of individual capsules, each of the capsules for selectively delivering a beverage in a beverage producing device by centrifugation of the capsule, each capsule containing at least one beverage substance, each capsule of the set comprising a body having an enclosure containing the beverage substance, an upper wall for closing the body and a flange-like rim, the rim has at least one portion having a thickness which differs for at least two capsules of the set so as to adjust the backpressure or backforce of a spring biasing member of the device onto the portion of the capsule when the capsule is engaged in the beverage production device.

* * * * *